Sept. 11, 1934.   G. H. CONNORS   1,973,610
AUTOMATIC COUPLING AND SHUT-OFF MECHANISM FOR VEHICLE HOSE LINES
Filed Sept. 19, 1932   3 Sheets-Sheet 1
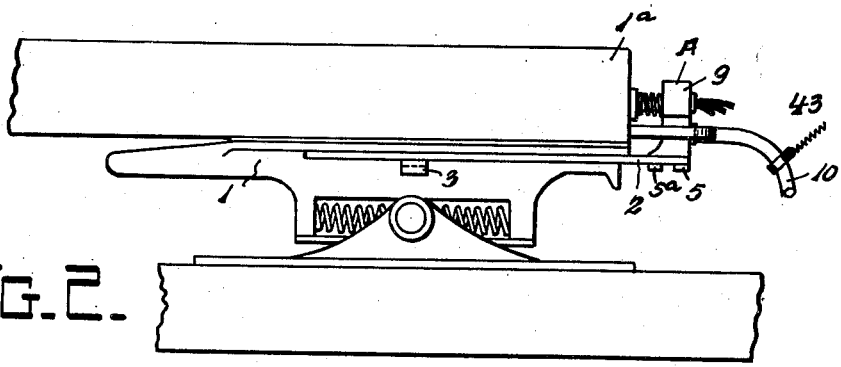
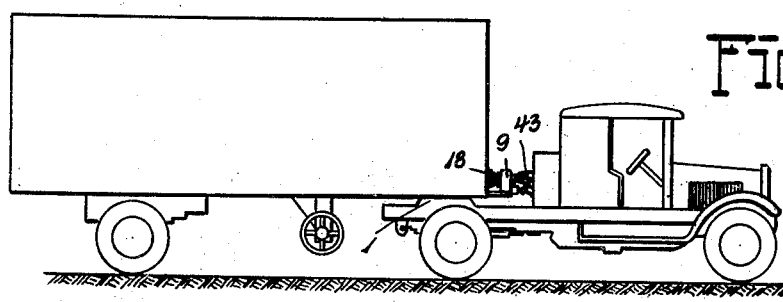
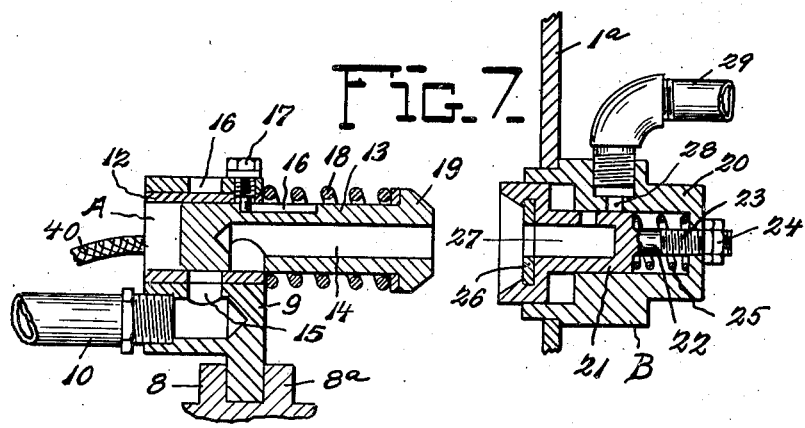
Inventor
GEORGE H. CONNORS.
By Robert Robb
Attorneys Sept. 11, 1934.   G. H. CONNORS   1,973,610
AUTOMATIC COUPLING AND SHUT-OFF MECHANISM FOR VEHICLE HOSE LINES
Filed Sept. 19, 1932   3 Sheets-Sheet 2
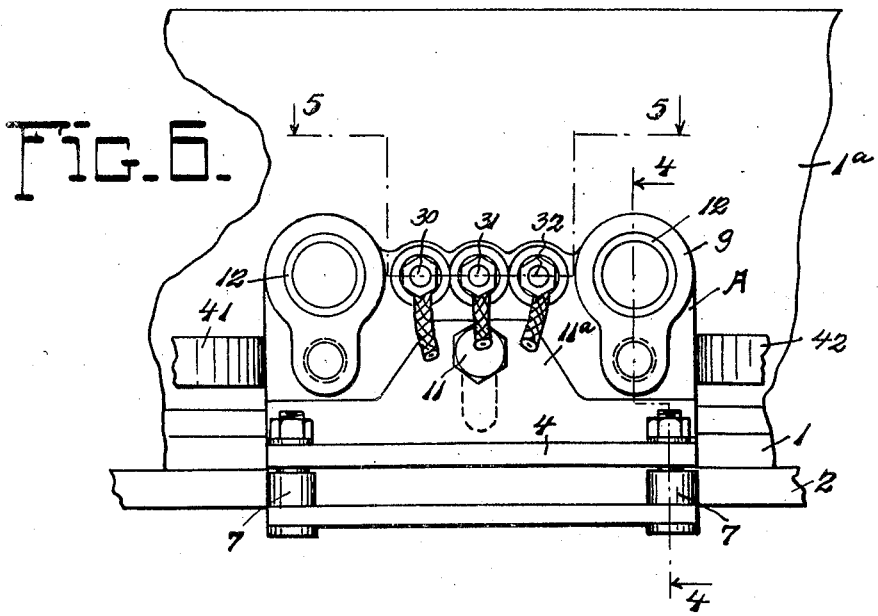
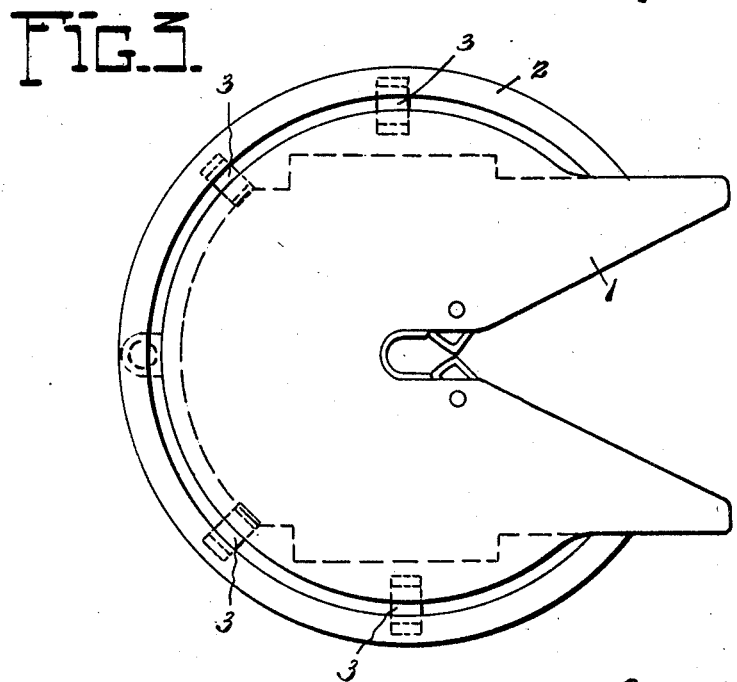
Inventor
GEORGE H. CONNORS.
By Robert Cobb
Attorneys Sept. 11, 1934. G. H. CONNORS 1,973,610
AUTOMATIC COUPLING AND SHUT-OFF MECHANISM FOR VEHICLE HOSE LINES
Filed Sept. 19, 1932 3 Sheets-Sheet 3
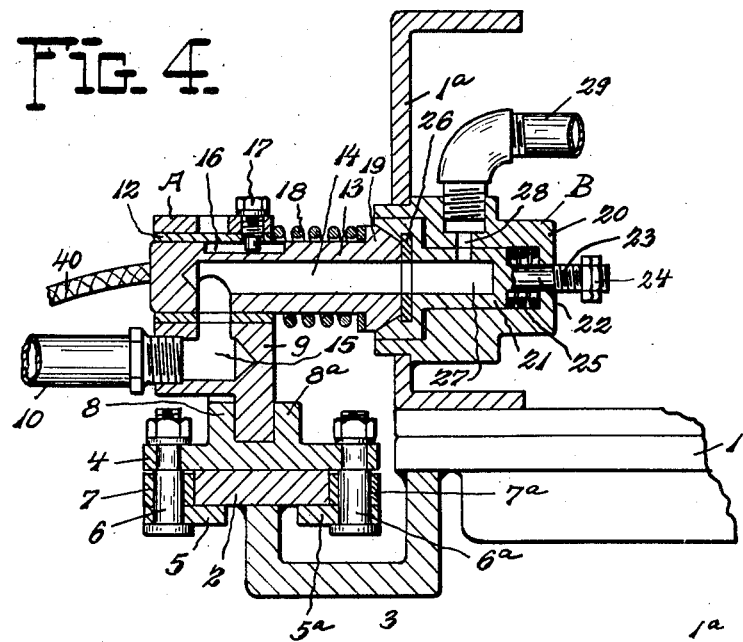
Inventor
GEORGE H. CONNORS.

Patented Sept. 11, 1934

1,973,610

UNITED STATES PATENT OFFICE 1,973,610

AUTOMATIC COUPLING AND SHUT-OFF MECHANISM FOR VEHICLE HOSE LINES

George H. Connors, Edgerton, Wis., assignor to Highway Trailer Company, Edgerton, Wis., a corporation Application September 19, 1932, Serial No. 633,875

8 Claims. (Cl. 280—33.1)

In the standard constructions of tractor and trailer units of the prior art, there is likelihood of damage arising to the hose lines employed to convey air pressure or suction to the trailer brakes by reason of the operator of the vehicles forgetting to shunt off the air or vacuum supplied through the brake lines when uncoupling the tractor from the trailer, as the control of the air and vacuum supplied, upon uncoupling the vehicles, has been accomplished through manually controlled instrumentalities; also, when the vehicles are coupled there is a possibility, when manual control is employed, of the operator forgetting to restore the air or vacuum supplies as the case may be so that the brakes can not be operated.

In the present invention there are provided instrumentalities whereby the air pressure or suction through the hose lines will be automatically shut off incidentally to the uncoupling of the vehicles, and restored upon coupling of the vehicles.

To this end the connecting instrumentalities for the tractor-trailer hose lines include sockets into which the trailer hose lines open, and which are adapted to receive nozzles of the hose lines of the tractor. The sockets and nozzles are mounted in a novel fashion to act as sliding valves to control the supply of air or vacuum through the hose lines, the sockets and nozzles being mounted so as to move automatically incidentally to the uncoupling of the tractor and trailer to cut off the air supply or vacuum as the vehicles separate upon uncoupling, while upon coupling the sockets and nozzles yield under coupling engagement of the vehicles to open the lines and restore the pressure or suction therethrough.

In order to maintain the necessary close contact between the sockets and nozzles under all conditions of operation of the vehicles, and to allow the necessary free motion of the socket and nozzle connections to correspond to the swinging of the tractor and trailer in rounding curves, there are provided carrying means for the hose lines which allow the required movement thereof to keep the connections unbroken under relative swinging motion between the vehicles. Also, instrumentalities are provided for securely holding the nozzles in air-tight engagement with the sockets while the vehicles are coupled.

The details of the construction of these various instrumentalities above indicated will become apparent as the description proceeds. It is to be noted, however, that one of the principal features of novelty in this invention is the construction and arrangement of the parts which provide the automatic making or breaking of the air and vacuum through the hose lines incidentally to coupling and uncoupling operations, thereby obviating the possibility of damage through any forgetfulness of the operator to manually control these supplies, as has been necessary in the constructions of the prior art.

The present invention also includes a novel mounting for the electrical contacts on the vehicles, which mounting assures a continuous engagement between the contacts of the vehicles while the vehicles are coupled.

The details of the improved mechanism and the operation thereof will become apparent from the following description when taken in connection with the accompanying drawings, in which Fig. 1 is a diagrammatic side elevation of a tractor and trailer coupled together, and indicating the improved coupling unit;

Fig. 2 is a side elevation of the upper and lower fifth wheel members of the vehicle showing the mounting of the coupling unit;

Fig. 3 is a top plan view of the lower fifth wheel, showing the mounting of a track upon which the coupling unit runs to accommodate itself to the swinging movements of the vehicles;

Fig. 4 is a sectional view along the line 4—4 of Fig. 6, showing certain details of the construction of the automatic control mechanism for the air or vacuum lines, the parts being shown in operative position with the vehicles coupled;

Fig. 5 is a view showing the mounting of the nozzles of the air or vacuum lines, and also the mounting of the electrical contacts for the tractor and trailer, the view being a sectional view along the line 5—5 of Fig. 6, the middle contact being shown in plan;

Fig. 6 is a front elevation of the coupling mechanism, looking from the front of the tractor;

Fig. 7 is a view similar to Fig. 4, but showing the parts in uncoupled position.

It will be seen from the drawings that the improved coupling mechanism is a unit formed of cooperating parts carried by the lower fifth wheel of the tractor and the upper fifth wheel of the trailer. The part carried by the lower fifth wheel is indicated at A, and that carried by the upper fifth wheel is designated B.

Taking up first the construction of part A, it will be seen that it comprises what might be termed an assembly carrier, a hose carrier mounted on the assembly carrier, a bushing in the hose carrier, and a nozzle slidably mounted in the bushing for controlling air or suction through the line.

It will be seen that the lower fifth wheel member 1 is provided with a substantially circular track 2, secured by brackets 3 to the lower fifth wheel 1. On this track runs the member 4, which carries the elements of part A aforesaid, which elements constitute the improvements of the present invention. This assembly carrier 4 is retained on the track 2 by the lower retaining members 5 and 5a engaging the bottom of the track and held in position by the bolts 6 and 6a. Between the carrying member 4 and the retaining members 5 and 5a are anti-friction rollers 7 and 7a, engaging the sides of the track 2.

The carrying member 4 is formed with upstanding flanges 8 and 8a, defining between them a U-shaped slot in which is mounted the hose carrier 9, into which an air or vacuum hose 10 is received.

The hose carrier 9 is secured in place by bolt 11 passed through the upstanding central part 11a of the assembly carrier 4. The hose carrier 9 is thereby firmly secured in position in the assembly carrier 4.

Within the hose carrier is positioned a bushing 12, in which the nozzle 13 is slidably mounted. The nozzle 13 is provided with a bore or passage 14 which communicates, when the nozzle is in operative position, with the bore or passage 15 which extends through the hose carrier 9 and receives the air or vacuum hose 10 therein. To allow the nozzle to slide in its bushing, the upper surface thereof is provided with a slot 16, into which is inserted the bolt 17, which is passed through the top of the hose carrier and the bushing 12. Arranged between the hose carrier and the flange 19 of the nozzle 13 is a spring 18. The pressure of this spring keeps the nozzle 13 extended when the tractor and trailer are uncoupled, thus bringing the passage 14 out of registry with passage 15, and closing the latter by the solid rear portion of the nozzle. Therefore, the flow of air through the line 10 is automatically stopped when the vehicles are uncoupled, the nozzle 13 acting as a sliding valve.

The part B of the connecting unit is mounted on the frame 1a of the trailer. The part B comprises a hose carrier and a nozzle retaining socket slidably mounted therein. The hose carrier is indicated at 20, and is mounted, as shown, in the trailer frame. The hose carrier is hollow and slidably positioned therein is the socket 21 adapted to receive the nozzle 13. This socket is provided with a stem 22, threaded at its end as indicated at 23, the nut 24 being positioned on these threads, whereby the amount of movement of the socket under influence of spring 25 is adjusted. To assure a tight connection with the nozzle 13, a resilient washer 26 is mounted in the socket.

The socket 21 is provided with the bore or passage 27 which is adapted to register with the passage 28 through the hose carrier 20. The passage 28 is enlarged to receive the hose line 29. As will plainly be seen from the drawings, the passage 14 registers with the passage 27 when the vehicles are coupled, and then air is free to pass through the line. It will be seen that, when the vehicles are coupled, the nozzle 13 is pressed back against the pressure of the spring 18, and the socket 21 is pressed against the spring 25, so that the passage of air is free throughout the line as soon as the vehicles are coupled. When uncoupled, the parts take the positions shown in Fig. 7, and the air passage is stopped by the outward movement of the nozzle 13 and socket 21 under the action of the respective springs 18 and 23. Therefore both the nozzle and the socket act as sliding valves to open and close the passage.

It is believed, in view of the above description, that the construction and operation of the connecting mechanism will be clear.

Passing now to the arrangement and mounting of the contacts, it will be seen that there are three contacts on the tractor, indicated at 30, 31 and 32, these contacts being in the form of pins mounted in the contact carrier 33, which is shown as being integral with the hose carriers 9. Each contact pin is mounted in a bushing 34 and insulated therefrom by insulation 35. Each contact pin terminates in a head 36. Suitably positioned around the contacts are springs 37 arranged to act upon the contacts and bushing.

The contacts 30, 31 and 32 engage corresponding contacts 30a, 31a and 32a, which are mounted in the trailer frame. These contacts are mounted in insulation 39. Each of these contacts 30, 31 and 32 has secured to it an electric cable 40, and corresponding cables are connected, of course, with the contacts 30a, 31a, and 32a. It will be seen that when the vehicles are coupled, the springs 37 constantly force the contacts 30, 31 and 32 against these respective contacts on the trailer, thus maintaining a close and effective contact.

It will be noted that the bushing 34 forms a continuous housing around the contacts, and that the bushing and contacts are pressed out by the springs 37 as a unit.

In order to assure proper positioning of the parts there are guides 41 and 42 mounted on the trailer which effectively guide the parts of the connector mechanism of the tractor into engagement with corresponding parts on the trailer.

When the tractor and trailer are uncoupled, the spring 43 holds the tractor assembly substantially in the center of the tractor chassis.

The movement of the assembly carrier around the track 2 maintains proper engagement of the parts of the connector unit mounted on the tractor and trailer, irrespectively of the swinging therebetween.

It is to be understood that the use of the expressions "fluid pressure operated instrumentalities", "fluid transmission lines", etc., wherever the same occur in the specification and claims, is intended to include vacuum systems as well as pneumatic and hydraulic systems and the equivalents.

Having thus described my invention, what I claim as new and desire to secure by Letters Patent of the United States is:

1. In a transmission system consisting of road vehicles of the tractor and trailer type, wherein the tractor and trailer are provided with coupling instrumentalities for connecting the tractor to the trailer and wherein fluid pressure operated instrumentalities are carried by each vehicle and wherein fluid transmission lines connect the instrumentalities with a source of supply, means for joining the fluid transmission lines of the trailer with that of the tractor, which includes a part mounted on the coupling instrumentality of one vehicle and connected to the fluid transmission lines of that vehicle, a second part mounted on the other vehicle and connected to the fluid transmission lines of said vehicle, said parts being adapted to cooperate to produce a continuous fluid transmission system from one vehicle to the other, one of said parts being movable with relation to the coupling instrumentalities and with relation to the other fluid transmission connecting part, and means for closing the fluid transmission lines adjacent the parts when said parts are not in cooperation.

2. In a highway transportation system of the tractor and trailer type, wherein each vehicle is provided with means for coupling the same together and instrumentalities operated by fluid pressure and having fluid transmission lines connected with said instrumentalities, connecting means for joining the fluid transmission lines of the tractor with that of the trailer, which includes a member mounted on a coupling instrumentality of one vehicle and connected with the fluid transmission lines thereof, a valve in said line normally held in closed position when said vehicles are uncoupled, a second member mounted on the other of said vehicles and connected with the fluid transmission lines of that vehicle, a valve associated with said member and normally held in closed position when said vehicles are uncoupled, said valves being opened upon cooperation of the members to establish a continuous fluid transmission line from one vehicle to the other, said cooperation being incident to the coupling of said vehicles.

3. In a tractor-trailer construction including the usual fifth wheel coupling parts for joining the vehicles and fluid pressure operated instrumentalities and fluid transmission lines, means for joining the fluid transmission lines of one vehicle to the fluid transmission lines of the other vehicle, which includes a nozzle, a carrier for the nozzle, means for movably mounting the carrier on one of the coupling instrumentalities, a passage in said carrier communicating with the fluid transmission lines of the vehicle on which it is mounted, a passage in said nozzle, said nozzle being movable with relation to said carriage to bring said passages into registry, a socket member for receiving said nozzle associated with the other of said vehicles, a carrier for said socket member, a passage in said socket member for cooperation with the passage in said nozzle, means for establishing communication between the passage of the socket member and the fluid transmission lines of the vehicle on which said member is mounted, said nozzle beng movable into engagement with the socket member incident to the coupling of the vehicle, each of said socket members and nozzles respectively being movable upon cooperation to produce an unobstructed fluid passage from one vehicle to the other.

4. In a highway transportation system, a pair of vehicles, one of said vehicles having a female fifth wheel part, the other of said vehicles having the male coupling part, and each of said vehicles having fluid operated instrumentalities and fluid transmission lines, means for coupling the fluid transmission lines of one vehicle with the other incident to the coupling of said vehicles through the fifth wheel means, which comprises a nozzle mounted on the female part, a carrier for the nozzle, a track supported by the fifth wheel part and supporting in turn the carrier, said carrier being movable on said track relative to the fifth wheel and being movable with said fifth wheel relative to the vehicle, a second coupling member rigidly mounted on said other vehicle and being adapted to cooperate with the nozzle when said vehicles are moved to coupling position, valve means associated with said nozzle and with said coupling part for closing the fluid transmitting lines of each of said vehicles when said vehicles are uncoupled, and resilient means for urging said valve means to closed position, said valve means being opened incident to cooperation between the nozzle and the coupler part.

5. In a highway transportation system of the tractor and trailer type, wherein each vehicle is provided with means for coupling the same together and instrumentalities operated by fluid pressure and having a fluid transmission line connected with said instrumentalities, connecting means for joining the fluid transmission line of the tractor with that of the trailer, which includes a member mounted on a coupling instrumentality of one vehicle and connected with the fluid transmission line thereof, a valve in said line normally held in closed position when said vehicles are uncoupled, a second member mounted on the other of said vehicles and connected with the fluid transmission line of that vehicle, a valve associated with said member and normally held in closed position when said vehicles are uncoupled, said valves being opened upon cooperation of the members to establish a continuous fluid transmission line from one vehicle to the other, said cooperation being incident to the coupling of said vehicles, and means for adjusting the extent of movement of one of the valves aforesaid.

6. In a highway transportation system of the tractor and trailer type, wherein each vehicle is provided with means for coupling the same together and instrumentalites operated by fluid pressure and having a fluid transmission line connected with said instrumentalities, connecting means for joining the fluid transmission line of the tractor with that of the trailer, which includes a member mounted on a coupling instrumentality of one vehicle and connected with the fluid transmission line thereof, a valve in said line normally held in closed position when said vehicles are uncoupled, a second member mounted on the other of said vehicles and connected with the fluid transmission line of that vehicle, a valve associated with said member and normally held in closed position when said vehicles are uncoupled, said valves being opened upon cooperation of the members to establish a continuous fluid transmission line from one vehicle to the other, said cooperation being incident to the coupling of said vehicles, and adjustable means for preventing closing movement of one of said valves when said vehicles are uncoupled.

7. In a highway transportation system of the tractor and trailer type, wherein each vehicle is provided with means for coupling the same together and instrumentalities operated by fluid pressure and having a fluid transmission line connected with said instrumentalities, connecting means for joining the fluid transmission line of the tractor with that of the trailer, which includes a member mounted on a coupling instrumentality of one vehicle and connected with the fluid transmission line thereof, a valve in said line normally held in closed position when said vehicles are uncoupled, a second member mounted on the other of said vehicles and connected with the fluid transmission line of that vehicle, a valve associated with said member and normally held in closed position when said vehicles are uncoupled, said valves being opened upon cooperation of the members to establish a continuous fluid transmission line from one vehicle to the other, said cooperation being incident to the coupling of said vehicles, and manually operated means for opening one of said valves when the vehicles are uncoupled.

8. In a highway transportation system of the tractor and trailer type, wherein each vehicle is provided with means for coupling the same together and instrumentalities operated by fluid pressure and having a fluid transmission line connected with said instrumentalities, connecting means for joining the fluid transmission line of the tractor with that of the trailer, which includes a member mounted on a coupling instrumentality of one vehicle and connected with the fluid transmission line thereof, a valve in said line normally held in closed position when said vehicles are uncoupled, a second member mounted on the other of said vehicles and connected with the fluid transmission line of that vehicle, a valve associated with said member and normally held in closed position when said vehicles are uncoupled, said valves being opened upon cooperation of the members to establish a continuous fluid transmission line from one vehicle to the other, said cooperation being incident to the coupling of said vehicles, and means for rendering one of said valves ineffectual for closing its respective fluid transmission line when the vehicles are uncoupled.

GEORGE H. CONNORS.